United States Patent [19]

Kline

[11] 4,254,020
[45] Mar. 3, 1981

[54] SYNERGISTIC ANTIOXIDANT MIXTURES

[75] Inventor: Richard H. Kline, Silver Lake, Ohio

[73] Assignee: The Goodyear Tire & Rubber Company, Akron, Ohio

[21] Appl. No.: 95,021

[22] Filed: Nov. 16, 1979

[51] Int. Cl.³ .................... C08K 5/37; C07C 149/20
[52] U.S. Cl. .................... 260/45.85 H; 252/406; 44/70; 260/398.5; 260/348.43; 560/15; 560/17; 560/152
[58] Field of Search ............ 260/45.85 H, 348.43, 260/398.5; 560/15, 17, 152; 252/48.6, 406; 44/70

[56] References Cited

U.S. PATENT DOCUMENTS

| | | | |
|---|---|---|---|
| 2,731,437 | 1/1956 | Bender et al. | 260/348.43 |
| 3,492,336 | 1/1970 | Giolito | 260/45.85 S |
| 3,629,194 | 12/1971 | Onishi et al. | 260/45.85 H |
| 3,743,679 | 7/1973 | Hickner et al. | 260/45.95 N |
| 3,758,549 | 9/1973 | Dexter et al. | 260/45.85 H |
| 4,125,515 | 11/1978 | Kuczkowski | 560/152 |

FOREIGN PATENT DOCUMENTS 44-32056 12/1969 Japan .
49-99973 9/1974 Japan ............................ 260/45.85 H

OTHER PUBLICATIONS

CA, 72, 6744(a) 1970.

*Primary Examiner*—V. P. Hoke

*Attorney, Agent, or Firm*—D. O. Nickey

[57] ABSTRACT

Compounds of the formula:

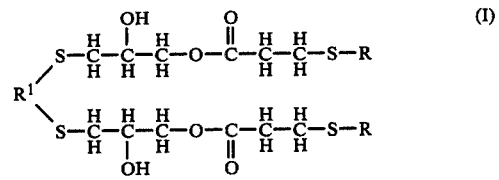

wherein R is selected from (1) alkyl radicals having 6 to 20 carbon atoms; (2) phenyl radicals which may be substituted by 1 or 2 alkyl groups having 1 to 8 carbon atoms; or (3) aralkyl radicals having 7 to 12 carbon atoms; and wherein $R^1$ is selected from (1) alkylene radicals having 2 to 6 carbon atoms; (2) cycloalkylene radicals having 5 to 12 carbon atoms; (3) alkylcycloalkylene radicals of the formula $-R_3-R_2(R_4)_n$, wherein $R_2$ is a cycloalkylene radical having 5 to 12 carbon and $R_3$ and $R_4$ are alkylene radicals having 1 to 6 carbon atoms, and n equals 1 or 0; (4) or a group of the formula $-R_5-YR_6$, wherein $R_5$ and $R_6$ are alkylene radicals having 2 to 6 carbon atoms and Y is oxygen, sulfur, or a 1,4-phenylene radical. These compounds have utility as synergistic stabilizers with phenolic type antioxidants in the stabilization of organic materials such as natural and synthetic polymers, rubbers, lubricants and oils, etc.

15 Claims, No Drawings

SYNERGISTIC ANTIOXIDANT MIXTURES

TECHNICAL FIELD

This invention relates to antioxidant systems. More particularly, it relates to organic compositions stabilized against oxidative degradation by a two component system consisting of a novel compound and a phenolic antioxidant.

BACKGROUND ART

It is well-known that such organic materials as plastics, rubbers, lubricating oils, etc. are prone to oxidation and deterioration in the presence of oxygen. Oxidation of organic materials causes the loss of those intrinsic properties characteristic of the organic material. With a view to preventing deterioration a variety of antioxidants have been developed, however, these antioxidants fail to prevent completely the deterioration of the desired properties of the materials to which they are added. Thus, those skilled in the art are constantly searching for new and more effective antioxidant systems which are useful for the protection of polymers and other organic materials.

Antioxidant synergists have been known in the art for some time. For example U.S. Pat. No. 3,492,336 discloses a novel tetra-alkyl thioethyl thiodisuccinate compound for use with phenolic type antioxidants in the stabilization of polyolefins.

An antioxidant composition comprising a synergistic mixture of a phenol, an amine and a sulfone is described in U.S. Pat. No. 3,839,210. Specifically, U.S. Pat. No. 3,839,210 discloses an antioxidant composition comprised of a mixture of an oil soluble phenol, an oil soluble amine and a long chain alkylthioethyl sulfone compound in an oxidizable organic material, particularly petroleum oils.

In U.S. Pat. No. 3,398,116 a thiocarboxylic acid thioether ester is used in combination with a limited group of phenolic antioxidants to stabilize poly-alpha-olefins against oxidative degradation. It is taught in U.S. Pat. No. 3,398,116 that the antioxidant activity of phenolic antioxidants in poly-alpha-olefin systems rises to an unexpectedly high level when used in association with thiodicarboxylic esters.

A synergistic, terpene-based, antioxidant system is disclosed in U.S. Pat. No. 3,491,044 in which a rosin alcohol ester of thiodipropinonic acid is used in combination with a tris-isobornyl phenol antioxidant to stabilize natural and synthetic polymers, rubber, lubricants and oils, etc.

In addition, U.S. Pat. No. 3,758,549 discloses polyalkanol esters of alkylthio-alkanoic acids as synergists with phenolic antioxidants and U.S. Pat. No. 3,666,716 and U.S. Pat. No. 3,505,225 discloses derivatives of diphenylamine and the phenylnaphthylamines as synergists with dialkyl 3,3'-thiodipropionates.

The art of using a combination of antioxidants has already been put into practice in industry and such antioxidant combinations are often highly effective. There has been prepared a variety of antioxidants which have been examined with a view towards obtaining more stable organic compositions. As a result it has been found that the combined use of the novel compounds of this invention and a phenolic antioxidant brings about an unexpectedly powerful antioxidative effect. None of the above cited patents or other literature in the art has disclosed or even suggests the compounds which are used in the practice of this invention.

DISCLOSURE OF THE INVENTION

The present invention relates to a stable organic composition which is prepared by mixing an organic material with a compound expressed by the general formula:

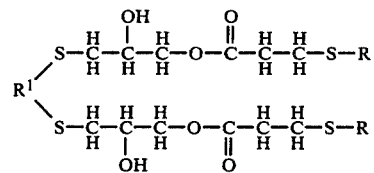

wherein R is selected from the group comprised of (1) alkyl radicals having 6 to 20 carbon atoms; (2) phenyl radicals which may be substituted by 1 or 2 alkyl groups having 1 to 8 carbon atoms; (3) aralkyl radicals having 7 to 12 carbon atoms; and wherein $R^1$ is selected from the group comprised of (1) alkylene radicals having 2 to 6 carbon atoms; (2) cycloalkylene radicals having 5 to 12 carbon atoms; (3) alkylcycloalkylene radicals of the formula $-R_3-R_2-(R_4)_n$, wherein $R_2$ is a cycloalkylene radical having 5 to 12 carbon atoms and $R_3$ and $R_4$ are alkylene radicals having 1 to 6 carbon atoms, and n equals 1 or 0; (4) or a group of the formula $R_5YR_6$, wherein $R_5$ and $R_6$ are alkylene radicals having 2 to 6 carbon atoms and Y is oxygen, sulfur or a 1,4-phenylene radical, along with a phenolic antioxidant.

The present invention also relates to the compounds expressed by general formula I and the process for the synthesis of compounds expressed by general formula I.

The compounds of this invention exhibit their novel properties when combined with the variety of stabilizers known as phenolics, many of which are commercially available and some of which are the subjects of patents.

DETAILED DESCRIPTION OF INVENTION

Typical of the phenolic antioxidants with stabilizing properties that are improved by the addition of compounds of the present invention are phenolic compounds having the geneal formulas:

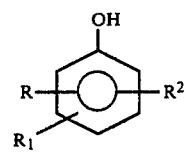

wherein R is a tert. alkyl radical having 4 to 8 carbon atoms, a cycloalkyl radical having 5 to 12 carbon atoms, or an aralkyl radical having 7 to 12 carbon atoms and wherein $R^1$ and $R^2$ are alkyl radicals having 1 to 12 carbon atoms, cycloalkyl radicals having 5 to 12 carbon atoms, or aralkyl radicals having from 7 to 12 carbon atoms;

or the formula:

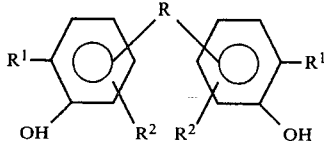

wherein R is an alkylidine radical having 1 to 4 carbon atoms, the group —O—, or the group —S—, and wherein $R^1$ and $R^2$ are alkyl radicals having 1 to 12 carbon atoms, cycloalkyl radicals having 5 to 12 carbon atoms, or aralkyl radicals having 7 to 12 carbon atoms. Preferably at least one of $R^1$ and $R^2$ is a tert.alkyl radical having 4 to 8 carbon atoms and is in a position ortho to the hydroxyl group,
or the formula:

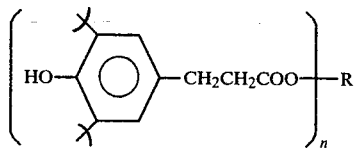

wherein $\psi$ is a tert.butyl radical and wherein n is an integer from 1 to 4 and R is an alkyl radical having 8 to 20 carbon atoms, an alkylene radical having 2 to 6 carbon atoms, a thiodialkylene radical wherein each alkylene radical has 2 to 6 carbon atoms, a trivalent radical derived from a straight or branched chain hydrocarbon having 3 to 8 carbon atoms, or a tetravalent radical derived from a straight or branched chain hydrocarbon having 4 to 8 carbon atoms.

Typical phenolic antioxidants applicable in the present invention include:
2,6-di-tert.butyl-4-methylphenol
2,4,6-tri-tert.butylphenol
2,2'-methylene-bis-(4-methyl-6-tert.butylphenol)
2,2'-thio-bis-(4-methyl-6-tert.butylphenol)
4,4'-thio-bis-(3-methyl-6-tert.butylphenol)
4,4'-butylidene-bis-(6-tert.butyl-3-methylphenol)
Styrenated phenol
Butylated Octylated Phenol
Butylated α-methylstyrenated phenol
Styrenated butylated m, p-cresol
4,4'-methylenebis (2,6-di-tert.butylphenol)
2,2'-methylenebis[4-methyl-6-(1-methylcyclohexyl)-phenol]
Butylated reaction product of p-cresol and dicyclopentadiene
Tetrakis[methylene 3-(3,5-di-tert.butyl-4-hydroxyphenyl)propionate]methane
1,3,5-trimethyl-2,4,6-tris(3,5-di-tert.butyl-4-hydroxybenzyl)benzene
Thiodiethylene bis [3-(3,5-di-tert.butyl-4-hydroxyphenyl)propionate]
Octadecyl 3-(3,5-di-tert.butyl-4-hydroxyphenyl)propionate The compounds of the present invention have as one of their characteristic properties the ability to vastly improve the effect of numerous compounds which are presently used as antioxidants for organic materials. Thus, while the compounds of the present invention may be considered as stabilizers in their own right, their properties are such that they would be more conventionally classified as "synergists", in that, when combined with known phenolic stabilizers they exhibit the ability to increase stabilization to a degree far exceeding that which would be expected from the additive properties of the individual components.

The compounds represented by the general formula I may comprise from 10 to 90% of the antioxidant system, however, the maximum effectiveness of the antioxidant system is achieved when a compound represented by the formula I is combined with a phenolic antioxidant at ratios varying from 1:4 to 4:1. The optimum ratio of a given combination varies depending on the organic material to which it is added.

The antioxidant system according to the present invention can be added to said organic materials in various ways. For instance, it can be applied either after dilution with a solvent or directly as it is. Addition of the present antioxidant system to the organic material can be performed either by applying a mixture prepared in advance (said phenolic antioxidant with the compounds specified in the present invention) or by applying these ingredients individually. Mixing of the present antioxidant system with substances such as resins, plastics and rubbers, which are solid at room temperatures can be readily performed by means of conventional equipment, such as, mixers, kneaders and roll mills.

It has been found that addition of the antioxidant system of this invention to organic materials in the range from 0.1 to 5.0 parts per hundred of organic material by weight will effectively protect the organic material from deterioration.

As described above the antioxidant system according to the present invention comprises the novel compound expressed by the general formula I combined with a known phenolic antioxidant. The antioxidant system of the present invention demonstrates antioxidative activity superior to that of most conventional antioxidant systems prepared by combining two or more commercial antioxidants.

Best Mode For Carrying Out The Invention

The novel compounds of this invention having the general structural formula I are prepared by the addition of a compound of the formula R—S—H, (II), wherein R is defined in formula I to 2,3-epoxypropyl acrylate (or methacrylate). The resulting 2,3-epoxypropyl 3-(R-thio) propionate is then reacted with a compound of the formula $HSR^1SH$, (III), wherein $R^1$ is as defined in formula I to yield the compounds of this invention. Both reactions are based catalyzed and may be carried out consecutively without isolation of the intermediate product. Suitable solvents for the reaction are alcohols, such as ethanol or 2-propanol, and both reactions may be carried out at a temperature between 10° C. or lower and the boiling point of the solvent.

The following examples are presented for illustration and not limitation.

EXAMPLE 1

A reaction vessel was charged with 20.2 grams (0.1 moles) of dodecanethiol and a solution of 12.8 grams (0.1 moles) of 2,3-epoxypropyl acrylate with 10 drops of Triton B ® (Trademark for a 40% solution of benzyltrimethylammonium hydroxide in methanol) and 50 milliliters of 2-propanol was added over a period of 5 minutes during which the temperature of the reaction mixture rose to 43° C. The mixture was then stirred for 3 hours at ambient temperature. The reaction product was 2,3-epoxypropyl 3(dodecylthio)propionate.

Preparation of Compound of Structural Formula (I)

EXAMPLE 2

To the solution of 2,3-epoxypropyl 3(dodecylthio)-propionate prepared as described in Example 1 above was added 0.5 grams (0.0075 moles) of potassium hydroxide. The potassium hydroxide was allowed to dissolve and 4.7 grams (0.05 moles) of 1,2-ethanedithiol was then added to the reaction mixture. A white solid precipitated from the mixture following the addition of the dithiol. The mixture was then stirred for 3 hours and the precipitated solid was filtered off. There was obtained 26.9 grams of 2,9-dihydroxy-4,7-dithiadecamethylene bis[3-(dodecylthio)propionate] with a melting point of 65°-68° C. 71% theoretical yield.

EXAMPLE 3

The procedure of Example 2 was repeated using 6.9 grams of 2-mercaptoethyl ether in place of the 1,2-ethanedithiol and there was obtained 26.3 grams (0.033 moles) of 2,12-dihydroxy-4,10-dithia-7-oxatridecamethylene bis[3-(dodecylthio)propionate] with a melting point of 62°-64° C.

EXAMPLE 4

The procedure of Example 2 was repeated using 5.4 grams (0.05 moles) of 1,2-propanedithiol in place of the 1,2-ethanedithiol. After stirring for a period of 3 hours, the reaction mixture was poured into 200 milliliters of water containing 5 milliliters of concentrated HCl. The organic oil was separated by extraction with hexane and hexane was removed from the extract by a rotary evaporator. The residue, a pale viscous liquid, weighed 37.5 grams. The NMR spectrum of the product indicated that it was 2,9-dihydroxy-4,7-dithia-5-methyldecamethylene bis[3-(dodecylthio)propionate].

EXAMPLE 5

Substituting 8.8 grams (0.05 moles) of 1,5-cyclooctanedithiol for the 1,2-propanedithiol of Example 4 yielded 36.5 grams (0.0435 moles) of a pale viscous liquid shown by its NMR spectrum to be 3,3'-(1,5-cyclooctanedithio)bis(2-hydroxypropyl)bis[3-(dodecylthio)propionate].

EXAMPLE 6

2,3-epoxypropyl 3-(phenylthio)propionate was prepared by adding 11.0 grams (0.1 moles) of benzenethiol to a solution of 12.8 grams of 2,3-epoxypropyl acrylate with 10 drops of Triton B® in 50 milliliters of 2-propanol. The addition was carried out over a period of 5 minutes during which the temperature of the reaction mixture rose to 54° C. The mixture was then stirred for 3.5 hours at ambient temperature. To this reaction mixture was added 0.5 grams of potassium hydroxide. After the potassium hydroxide had dissolved there was added 5.4 grams of propanedithiol and the reaction mixture was stirred for 3.5 hours. The mixture was then poured into a solution of 5 milliliters of concentrated hydrochloric acid in 100 milliliters of water. The organic oil was separated by extraction with toluene and toluene was then removed from the extract by rotary evaporator. There was obtained 26.6 grams (0.091 moles) of a viscous liquid shown by its NMR spectrum to be 2,9-dihydroxy-4,7-dithia-5-methyldecamethylene bis[3-(phenylthio)propionate].

EXAMPLE 7

Substitution of 12.4 grams (0.1 moles) of benzyl mercaptan and 4.7 grams (0.05 moles) of 1,2-ethanedithiol for the benzenethiol and 1,2-propanedithiol in the procedure described in Example 6 yields 31 grams of a viscous oil identified by its NMR spectrum to be 2,9-dihydroxy-4,7-dithiadecamethylene bis[3-(benzylthio)propionate].

Testing of Compounds of Structural Formula (I)

The antioxidative activity of the compounds and mixtures of this invention was determined by means of the oxygen absorption test. The testing procedure is of the type described in detail in *Industrial and Engineering Chemistry*, Vol. 43, Page 456, (1951), and *Industrial and Engineering Chemistry*, Volume 45, Page 392 (1953). A mixture of 0.5 parts of each compound from Examples 2 to 7 and 0.5 parts of butylated octylated phenol was added to 100 parts of SBR 1006 and oxygen absorption measurements were made on the samples at 100° C. In addition, each compound from Examples 2 through 7 of the present invention and butylated octylated phenol was added individually to SBR 1006 at a concentration of 0.5 parts per hundred and these samples were tested in the same way. The data obtained from these tests were used to calculate the synergistic effect (SE). This quantity is defined by G. Scott on page 205 of *Atmospheric Oxidation and Antioxidants*, Elsevier Publishing Company, (1965) as $$SE = \frac{M - (a + b)}{a + b} \times 100,$$

where M equals the activity of the mixture; "a" equals the activity of component "a"; and "b" equals the activity of component "b".

The time, in hours, required for each sample to absorb 1% oxygen by weight and the calculated SE values are listed in the Table I below.

TABLE I

Synergistic Activity of the Compounds of this Inventon

| Synergist Product of Example | Hours to Absorb 1% Oxygen Additive | Additive + B.O.P.* | SE |
|---|---|---|---|
| 2 | 62 | 720 | 168 |
| 3 | 60 | 667 | 150 |
| 4 | 53 | 862 | 232 |
| 5 | 61 | 750 | 180 |
| 6 | 45 | 616 | 144 |
| 7 | 31 | 470 | 97 |
| B.O.P.* | 207 | — | — |
| DLTDP** | 48 | 498 | 90 |

*B.O.P. = Butylated Octylated Phenol
**DLTDP = Dilauryl 3,3'-thiodipropionate - the most widely used commercial synergist Had no antioxidant been present, the SBR 1006 would have absorbed 1% oxygen in 5 to 10 hours.

It is evident that the compounds of this invention are much more effective than the well-known synergist DLTDP, which is now the synergist of choice in the industry.

In addition, the compound of Example 4 was combined with six commercially available antioxidants (0.5 parts of each by weight) and the mixtures were added to SBR-1006 at a concentration of 1 phr. The samples were subjected to the oxygen absorption test cited above with the following results:

TABLE II

| Antioxidant | A.O. Alone | A.O. plus Ex. 4 | Synergistic Effect |
| --- | --- | --- | --- |
| 1 | 134 | 654 | 301 |
| 2 | 148 | 488 | 176 |
| 3 | 340 | 1038 | 181 |
| 4 | 249 | 722 | 160 |
| 5 | 595 | 855 | 37 |
| 6 | 372 | 653 | 63 |

The identity of the antioxidants used in Table II are set out below.

| Antioxidant No. | Chemical Name |
| --- | --- |
| 1 | Styrenated phenol |
| 2 | Butylated α-methylstyrenated phenol |
| 3 | Butylated reaction product of p-cresol and dicyclopentadiene |
| 4 | Styrenated butylated m, p-cresol |
| 5 | 2,2'-methylenebis(4-methyl-6-tert.-butyphenol) |
| 6 | 4,4'-Thiobis(3-methyl-6-tert.butyphenol) |

It is evident from Table II that the compound from Example 4 exhibits synergistic activity with a number of commercially available antioxidants.

Additional synergistic activity of the compounds of his invention was determined by means of the circulating hot air oven test. This testing procedure is one commonly employed in the industry and was conducted using the products from Examples 2, 4 and 5.

The products from Examples 2, 4 and 5 were evaluated alone and in combination with the commercially available phenolic antioxidant Tetrakis [methylene 3-(3,5-di.tert.butyl-4-hydroxyphenyl)propionate] methane (hereinafter known as TMPM) in polypropylene.

The testing procedure consists of dissolving the compound or compounds in a suitable solvent such as toluene. The solution was deposited on a commercially available unstabilized polypropylene known as Profax ® 6501 at a concentration of 0.10 pph by weight if evaluated alone and in a concentration of 0.05/0.05 pph blend by weight when evaluated with TMPM. The materials were blended with a Henschel blender until all the solvent had evaporated. The stabilized resin was then injection molded to form a dumbell shaped test specimen using appropriate injection molding conditions.

The resulting test specimens were then oven aged in triplicate at 140° C. in a circulating hot air oven and observed daily. The first signs of degradation that were noted is crazing. The failure point was embrittlement to flexing, that is, bending by hand to less than 90°. Failure times are the average for the three samples.

Table III is test data for the products of Examples 2, 4, and 5 alone at a concentration of 0.1 pph by weight of polypropylene, and in combination with TMPM at a concentration of 0.05 pph for the example and 0.05 pph for the TMPM in the polypropylene. In addition, distearyl thiodipropionate was tested, evaluated alone and in combination with TMPM at the concentrations as stated above. Distearyl thiodipropionate is a commercially available synergist marketed under the name Plastanox STDP ®.

TABLE III

| Synergist Product of Example | SYNERGISTIC ACTIVITY IN POLYPROPYLENE | | | |
| --- | --- | --- | --- | --- |
| | Days to Crazing | | Days to Failure | |
| | Additive | Additive + TMPM | Additive | Additive + TMPM |
| 2 | 10 | 71 | 11 | 72 |
| 4 | 3 | 73 | 4 | 75 |
| 5 | 3 | 80 | 3 | 81 |
| TMPM* 0.005 pph | 21 | — | 23 | — |
| TMPM* 0.1 pph | 86 | — | 88 | — |
| STDP** | 2 | 60 | 2 | 60 |

*Tetrakis [methylene 3-(3,5-ditert.butyl-4-hydroxy-phenyl)propionate] methane
**Distearyl thiodipropionate From Table III it is evident that the products of Examples 2, 4 and 5 of this invention exhibit synergistic activity greater than a known and commercially accepted synergist.

Industrial Applicability

From the testing data obtained it is evident that the compounds disclosed herein significantly enhance the stability of SBR 1006 and polypropylene when combined with a known phenolic antioxidant, (i.e. butylated octylated phenol). The industrial applications are readily apparent in light of the high synergistic activity of these novel compounds when used in conjunction with known phenolic antioxidants. Use of the compounds of this invention would significantly reduce the amount of costly phenolic antioxidant that is needed to provide the desired stability of the organic material. In addition, the use of these novel antioxidant systems would lessen the undesirable effects of color formation and discoloration.

While certain representative embodiments and details have been shown for the purpose of illustrating the invention, it will be apparent to those skilled in this art that various changes and modifications may be made herein without departing from the spirit or scope of this invention.

I claim:

1. A composition comprising (A) organic material selected from the group of oxidizable polymers, oils, resins, waxes and fuels; containing an effective amount of a mixture of (B) a phenolic antioxidant and (C) a compound of the formula:

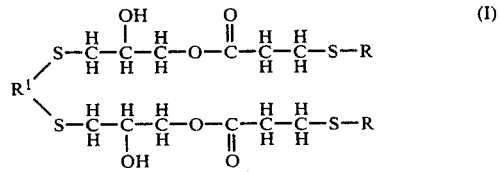

wherein R is selected from the group comprised of (1) alkyl radicals having 6 to 20 carbon atoms; (2) phenyl radicals which may be substituted by 1 or 2 alkyl groups having 1 to 8 carbon atoms; (3) or aralkyl radicals having 7 to 12 carbon atoms, and wherein $R^1$ is selected from the group comprised of (1) alkylene radicals having 2 to 6 carbon atoms; (2) cycloalkylene radicals having 5 to 12 carbon atoms; (3) alkylcycloalkylene radicals of the formula $—R_3—R_2—(R_4)_n$, wherein $R_2$ is a cycloalkylene radical having 5 to 12 carbon atoms and $R_3$ and R4 are alkylene radicals having 1 to 6 carbon atoms, and n equals 1 or 0; (4) or a group of the formula $R_5YR_6$, wherein $R_5$ and $R_6$ are alkylene radicals having 2 to 6 carbon atoms and Y is oxygen, sulfur or a 1,4-phenylene radical; the ratio of C to B ranging from 1:4 to 4:1.

2. A composition according to claim 1 wherein $R^1$ is an ethylene radical of the formula —CH2—CH2— and R is a dodecyl radical.

3. A composition according to claim 1 wherein $R^1$ is a propylene radical of the formula

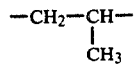

and R is a dodecyl radical.

4. A composition according to claim 1 wherein the phenolic antioxidant (B) is selected from the group comprising
2,6-di-tert.butyl-4-methylphenol
2,4,6-tri-tert.butylphenol
2,2'-methylene-bis-(4-methyl-6-tert.butylphenol)
2,2'-thio-bis-(4-methyl-6-tert.butylphenol)
4,4'-thio-bis-(3-methyl-6-tert.butylphenol)
4,4'-butylidene-bis-(6-tert.butyl-3-methylphenol)
Styrenated phenol
Butylated octylated phenol
Butylated α-methylstyrenated phenol
Styrenated butylated m, p-cresol
4,4'-methylenebis(2,6-di-tert.butylphenol)
2,2'-methylenebis[4-methyl-6-(1-methylcyclohexyl)-phenol]
Butylated reaction product of p-cresol and dicyclopentadiene
Tetrakis [methylene 3-(3,5-di-tert.butyl-4-hydroxyphenyl)propionate]methane
1,3,5-trimethyl-2,4,6-tris(3,5-di-tert.butyl-4-hydroxybenzyl)benzene
Thiodiethylene bis[3-(3,5-di-tert.butyl-4-hydroxyphenyl)propionate]
Octadecyl 3-(3,5-di-tert.butyl-4-hydroxyphenyl)propionate 5. An antioxidant composition comprised of a phenolic antioxidant (B); and a compound (C) of general formula

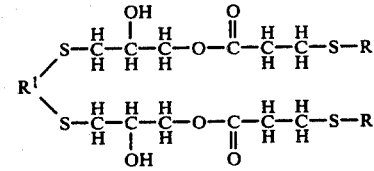

wherein R is selected from the group comprised of (1) alkyl radicals having 6 to 20 carbon atoms; (2) phenyl radicals which may be substituted by 1 or 2 alkyl groups having 1 to 8 carbon atoms; (3) or aralkyl radicals having 7 to 12 carbon atoms, and wherein $R^1$ is selected from the group comprised of (1) alkylene radicals having 2 to 6 carbon atoms; (2) cycloalkylene radicals having 5 to 12 carbon atoms; (3) alkylcycloalkylene radicals of the formula $—R_3—R_2—(R_4)_n$, wherein $R_2$ is a cycloalkylene radical having 5 to 12 carbon atoms and $R_3$ and $R_4$ are alkylene radicals having 1 to 6 carbon atoms, and n equals 1 or 0; (4) or a group of the formula $R_5YR_6$, wherein $R_5$ and $R_6$ are alkylene radicals having 2 to 6 carbon atoms and Y is oxygen, sulfur or a 1,4-phenylene radical; the amount of (C) being from 20 to 80% of the total antioxidant composition.

6. An antioxidant composition according to claim 5 wherein $R^1$ is an ethylene radical of the formula —CH2—CH2— and R is dodecyl radical.

7. An antioxidant composition according to claim 5 wherein $R^1$ is a propylene radical of the formula

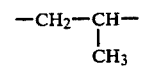

and R is dodecyl radical.

8. An antioxidant composition according to claim 5 wherein the phenolic antioxidant (B) is selected from the group
2,6-di-tert.butyl-4-methylphenol
2,4,6-tri-tert.butylphenol
2,2'-methylene-bis-(4-methyl-6-tert.butylphenol)
2,2'-thio-bis-(4-methyl-6-tert.butylphenol)
4,4'-thio-bis-(3-methyl-6-tert.butylphenol)
4,4'-butylidene-bis-(6-tert.butyl-3-methylphenol)
Styrenated phenol
Butylated octylated phenol
Butylated α-methylstyrenated phenol
Styrenated butylated m, p-cresol
4,4'-methylenebis(2,6-di-tert.butylphenol)
2,2'-methylenebis[4-methyl-6-(1-methylcyclohexyl)-phenol]
Butylated reaction product of p-cresol and dicyclopentadiene
Tetrakis [methylene 3-(3,5-di-tert.butyl-4-hydroxyphenyl)propionate]methane
1,3,5-trimethyl-2,4,6-tris(3,5-di-tert.butyl-4-hydroxybenzyl)benzene
Thiodiethylene bis[3-(3,5-di-tert.butyl-4-hydroxyphenyl)propionate]
Octadecyl 3-(3,5-di-tert.-butyl-4-hydroxyphenyl) propionate 9. A compound of the formula:

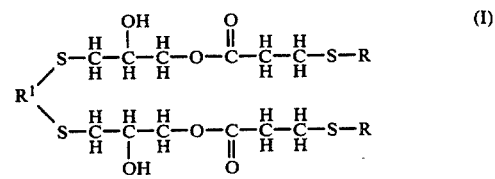

wherein R is selected from the group comprised of (1) alkyl radicals having 6 to 20 carbon atoms; (2) phenyl radicals which may be substituted by 1 or 2 alkyl groups having 1 to 8 carbon atoms; (3) or aralkyl radicals having 7 to 12 carbon atoms, and wherein $R^1$ is selected from the group comprised of (1) alkylene radicals having 2 to 6 carbon atoms; (2) cycloalkylene radicals having 5 to 12 carbon atoms; (3) alkylcycloalkylene radicals of the formula $—R_3—R_2—(R_4)_n$, wherein $R_2$ is a cycloalkylene radical having 5 to 12 carbon atoms and $R_3$ and $R_4$ are alkylene radicals having 1 to 6 carbon atoms, and n equals 1 or 0; (4) or a group of the formula $R_5YR_6$, wherein $R_5$ and $R_6$ are alkylene radicals having 2 to 6 carbon atoms and Y is oxygen, sulfur or a 1,4-phenylene radical.

10. A compound according to claim 9 wherein $R^1$ is an ethylene radical of the formula —CH2—CH2— and R is a dodecyl radical.

11. A compound according to claim 9 wherein $R^1$ is a propylene radical of the formula

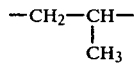

and R is a dodecyl radical.

12. A compound according to claim 9 which is 2,9-dihydroxy-4,7-dithiadecamethylene bis[3-(dodecylthio)propionate].

13. A compound according to claim 9 which is 2,9-dihydroxy-4,7-dithia-5-methyldecamethylene bis[3-dodecylthio)propionate].

14. A process for the production of a compound of the structural formula:

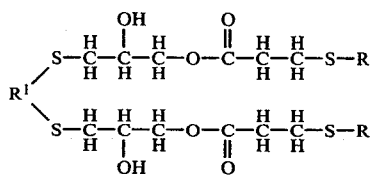

wherein R is selected from the group comprised of (1) alkyl radicals having 6 to 20 carbon atoms; (2) phenyl radicals which may be substituted by 1 or 2 alkyl groups having 1 to 8 carbon atoms; (3) or aralkyl radicals having 7 to 12 carbon atoms, and wherein $R^1$ is selected from the group comprised of (1) alkylene radicals having 2 to 6 carbon atoms; (2) cycloalkylene radicals having 5 to 12 carbon atoms; (3) alkylcycloalkylene radicals of the formula $-R_3-R_2-(R_4)_n$, wherein $R_2$ is a cycloalkylene radical having 5 to 12 carbon atoms and $R_3$ and $R_4$ are alkylene radicals having 1 to 6 carbon atoms, and n equals 1 or 0; (4) or a group of the formula $R_5YR_6$, wherein $R_5$ and $R_6$ are alkylene radicals having 2 to 6 carbon atoms and Y is oxygen, sulfur or a 1,4-phenylene radical; wherein a compound of the general formula

wherein R is selected from the group comprised of (1) alkyl radicals having 6 to 20 carbon atoms; (2) phenyl radicals which may be substituted by 1 or 2 alkyl groups having 1 to 8 carbon atoms; (3) or aralkyl radicals having 7 to 12 carbon atoms is reacted with 2,3-epoxypropyl acrylate to yield an intermediate 2,3-epoxypropyl 3-(R-thio)propionate; this intermediate is reacted with a compound of the formula $HSR^1SH$, wherein $R^1$ is selected from the group comprised of (1) alkylene radicals having 2 to 6 carbon atoms; (2) cycloalkylene radicals having 5 to 12 carbon atoms; (3) alkylcycloalkylene radicals of the formula $-R_3R_2-(R_4)_n$ wherein $R_2$ is a cycloalkylene radical having 5 to 12 carbon atoms and $R_3$ and $R_4$ are alkylene radicals having 1 to 6 carbon atoms, and n equals 1 or 0; (4) or a group of the formula $R_5YR_6$, wherein $R_5$ and $R_6$ are alkylene radicals having 2 to 6 carbon atoms and Y is oxygen, sulfur, or a 1,4-phenylene radical, to yield the compounds of this invention; both reactions being base catalyzed.

15. A process according to claim 14 wherein dodecanethiol is reacted with 2,3-epoxypropyl acrylate at ambient temperature in ethanol or 2-propanol; 1,2-ethanedithiol is added to the reaction mixture at room temperature and the product, 2,9-dihydroxy-4,7-dithiadecamethylene bis[3-(dodecylthio)propionate] is isolated.

* * * * *